(12) United States Patent (10) Patent No.: US 6,901,986 B2
Bradish (45) Date of Patent: Jun. 7, 2005

(54) CARBON FIBER-FILLED SHEET MOLDING COMPOUND AND METHOD OF MANUFACTURING SAME

(75) Inventor: Frank W. Bradish, Ortonville, MI (US)

(73) Assignee: Patent Holding Company, Fraser, MI (US)

( * ) Notice: Subject to any disclaimer, the term of this patent is extended or adjusted under 35 U.S.C. 154(b) by 69 days.

(21) Appl. No.: 10/300,074

(22) Filed: Nov. 20, 2002

(65) Prior Publication Data

US 2003/0099734 A1 May 29, 2003

Related U.S. Application Data

(62) Division of application No. 09/525,352, filed on Mar. 15, 2000, now Pat. No. 6,508,906.

(51) Int. Cl.[7] .............................................. B32B 31/00
(52) U.S. Cl. ........................ 156/538; 156/509; 156/508; 156/458; 156/495; 156/406.4; 156/390; 156/442.2
(58) Field of Search .............................. 156/390, 406.4, 156/442.2, 458, 495, 508, 509, 538; 428/251, 246, 282, 902

(56) References Cited

U.S. PATENT DOCUMENTS 3,778,334 A 12/1973 Sturgeon
4,992,127 A * 2/1991 Kishi et al. .................. 156/182
5,484,652 A * 1/1996 Strunk et al. ................ 442/281
5,599,599 A 2/1997 Mirmiran et al.

FOREIGN PATENT DOCUMENTS

EP 0 122 024 10/1984

* cited by examiner

*Primary Examiner*—Merrick Dixon
(74) *Attorney, Agent, or Firm*—Brooks Kushman P.C.

(57) ABSTRACT

The present invention involves a carbon fiber-filled sheet molding compound and method of manufacturing the same. The invention comprises providing chopped automotive carbon fibers, a predetermined resin paste, a first carrier film, and a second carrier film. The method further involves coating substantially completely one side of one of the first and second carrier films with the predetermined resin paste to define a coated side, depositing the chopped automotive carbon fibers onto the coated side, and covering the deposited carbon fibers with the second carrier film to define a compactible carbon-filled laminate. The method further includes compacting the carbon-filled laminate to admix the resin paste with the carbon fibers between the films, whereby to form the automotive carbon fiber-filled sheet molding compound.

10 Claims, 1 Drawing Sheet

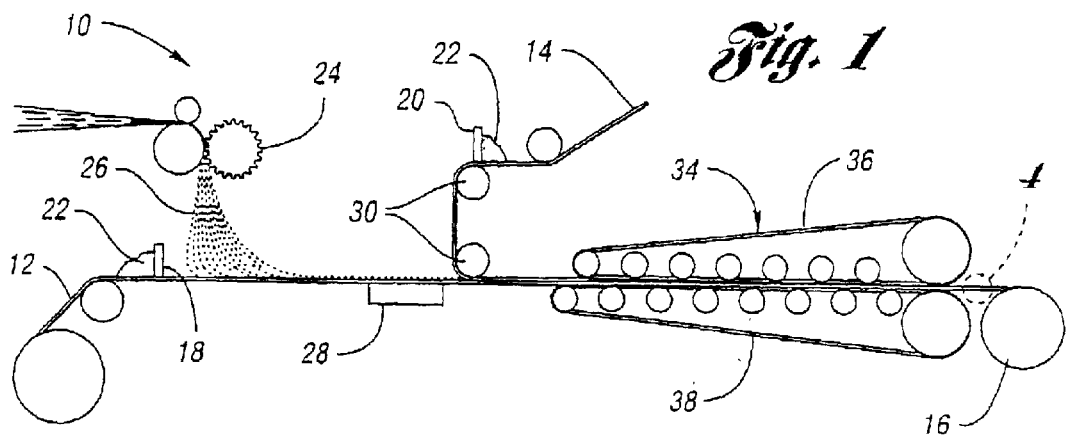
*Fig. 1*
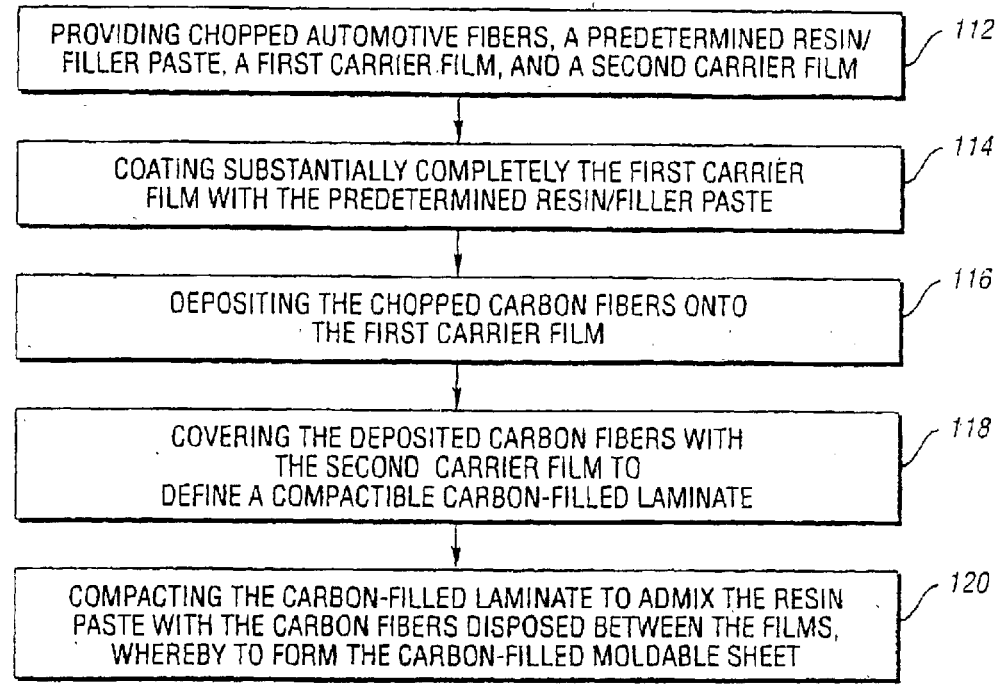
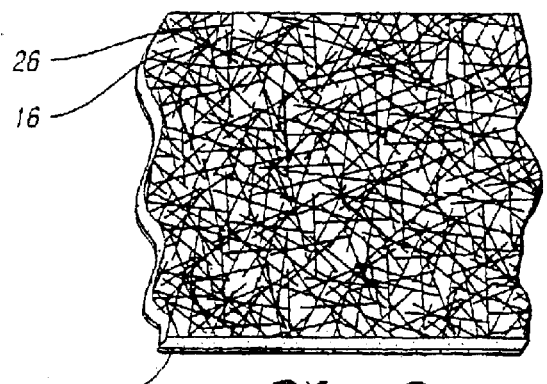
*Fig. 3*
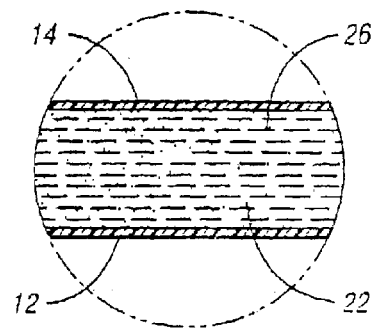
*Fig. 4*

US 6,901,986 B2

CARBON FIBER-FILLED SHEET MOLDING COMPOUND AND METHOD OF MANUFACTURING SAME

This is a divisional of application(s) Ser. No. 09/525,352 filed on Mar. 15, 2000 now U.S. Pat. No. 6,508,906.

TECHNICAL FIELD

The present invention relates to commercial carbon fiber-filled sheet molding compound having light weight, high stiffness, and high strength.

BACKGROUND ART

The process of compression molding has grown to be ever so common. The product used in and produced by the process of compression molding is termed sheet molding compound or SMC. Compression molding was developed for replacement of metal components with composite parts. The molding process is typically carried out with either thermosets. Typically, a thermoset charge is placed in a two-piece heated mold which is subsequently closed and held at a high pressure. This initiates a thermal setting cure reaction. Typical products manufactured by compression molding include front and rear end vehicle panels, hoods, roofs, fenders, spoilers, and air deflectors.

Many SMC products are filled with fibers, such as glass fibers. Glass fibers provide strength and stiffness. U.S. Pat. No. 5,484,652 to Strunk et al. involves a material for smoothing the outside surface of a woven fabric composite lay up in which a layered sandwich structure is formed of continuous fiber woven material, resin films and a mat of randomly oriented discontinuous fibers. The sandwiched layers are integrated into a single sheet of resin impregnated material by application of pressure and heat.

However, costs for painting or coating glass fiber-filled SMC products can be reduced. Typically, a conductive primer is applied onto glass fiber-filled SMC products before color painting or coating the product. The conductive primer provides for the ability to electrostatically paint or coat the SMC product. Because glass fiber-filled SMC products are not conductive, without application of conductive primer onto the SMC product, subsequent painting or coating onto the product would result in a low efficiency paint transfer upon the product surface. This results in higher costs and increased time of production. If the manufacturing step of applying conductive primer onto the SMC product can be eliminated, then substantial cost savings would be experienced.

Moreover, as the price of glass fibers remains stagnantly high and the price of automotive carbon fibers continues to decrease, feasibility and demand to use automotive carbon fibers in lieu of glass fibers in SMC products grow. Generally, carbon fibers are more expensive than glass fibers, but add greater strength and stiffness when used in SMC products. Carbon fibers are also lighter weight than glass fibers at comparable fiber loading.

What is needed is an automotive carbon fiber-filled SMC product that provides for electrostatically painting or coating the product without applying a conductive primer.

What is also needed is a method of making a carbon fiber-filled SMC that has high stiffness and strength.

DISCLOSURE OF INVENTION

It is an object of the present invention to provide an improved method of making automotive carbon fiber-filled SMC that is lighter weight than glass fiber-filled SMC at comparable fiber loadings.

It is another object of the invention to provide an improved SMC that provides for electrostatically coating or painting directly thereon without applying a conductive primer.

It is yet another object of this invention to provide an improved method of making a carbon fiber-filled SMC that has high stiffness and strength.

A more specific object of this invention includes a method of making from laminate an automotive carbon fiber-filled sheet molding compound having the characteristic of light weight, high stiffness, and high strength. The method comprises providing chopped automotive carbon fibers, a predetermined resin paste, a first carrier film, and a second carrier film. The method further comprises coating substantially completely one side of one of the first and second carrier films with the predetermined resin paste to define a coated side, depositing the chopped automotive carbon fibers onto the coated side, and covering the deposited carbon fibers with the second carrier film to define a compatible carbon-filled laminate. The method further comprises compacting the carbon-filled laminate to admix the resin paste with the carbon fibers between the films, whereby to form the automotive carbon fiber-filled sheet molding compound.

Another more specific object of this invention includes an automotive carbon-filled sheet molding compound having the characteristics of light weight, high stiffness and high strength. The compound is manufactured by providing chopped automotive carbon fibers, a predetermined resin paste, a first carrier film, and a second carrier film. The process by which the sheet molding compound is manufactured further includes coating substantially completely at least one of the opposed sides of the carrier films with the predetermined resin paste to define coated sides of the first and second carrier films, depositing the chopped automotive carbon fibers onto the coated side of the first carrier film, and covering the deposited carbon fibers with the coated side of the second carrier film to define a compactable carbon-filled laminate. The process by which the compound is manufactured further comprises compacting the carbon-filled laminate to admix the resin paste with the carbon fibers disposed between the films, whereby to form the compound.

Yet another more specific object of this invention includes an automotive carbon-filled compound being lightweight and having high stiffness and strength, the carbon-filled compound produced by the process of manufacturing sheet molding compound.

Another more specific object of this invention provides for a system for making from laminate an automotive carbon fiber-filled sheet molding compound having the characteristics of light weight, high stiffness, and high strength. The system comprises a first mechanism for providing chopped automotive carbon fibers, a predetermined resin paste, a first carrier film, and a second carrier film. The system further includes a second mechanism for coating substantially completely one side of one of the first and second carrier films with the predetermined resin paste to define a coated side, a third mechanism for depositing chopped automotive carbon fibers onto the coated side, and a fourth mechanism for covering the deposited carbon fibers with the second carrier film to define a compactible carbon-filled laminate. The system further comprises a fifth mechanism for compacting the carbon-filled laminate to admix the resin paste with the carbon fibers between the films, whereby to form the automotive carbon fiber-filled sheet molding compound.

BRIEF DESCRIPTION OF DRAWINGS

FIG. 1 is a view of a system implemented to carry out one method of the present invention;

FIG. 2 is a flow chart depicting one method of the present invention;

FIG. 3 is a top view of a coated side of a carrier film with deposited carbon fibers in the method of FIG. 2; and FIG. 4 is a cross-sectional view of a compacted carbon-filled laminate of FIG. 1.

BEST MODE FOR CARRYING OUT THE INVENTION

FIG. 1 illustrates system 10 implemented to carry out one method of the present invention. System 10 receives first carrier film 12 and second carrier film 14, both of which are wound therethrough by winder 16. Winder 16 may be a mandrel about which the carrier films are wound and may be disposed across the width of the films. Winder 16 may be driven by any suitable motor (not shown).

As shown, first carrier film 12 is wound by winder 16 through system 10 from therebelow and second carrier film 14 is wound through system 10 from above. System 10 further includes doctor box 18 and doctor box 20 which receive resin paste or resin/filler paste 16. As films 12, 14 are wound by winder 16, doctor boxes 18, 20 respectively spread resin/filler paste 22 onto opposing sides of films 12, 14 to define coated sides of first and second carrier films 12, 14. System 10 further includes cott roll or chopper 24 for chopping carbon fibers 26 which are deposited, as described below, onto the coated side of first carrier film 12.

Doctor boxes 18, 20 may be any suitable type of apparatus which may spread the resin paste onto the carrier film to coat the carrier film. Doctor boxes 18 and 20 may be heated to aid in keeping the resin/filler paste 22 at a workable viscosity, between 800 and 200,000 centipoise (CPS). Moreover, chopper 24 may be any suitable type of chopper 24, such as a rotary cutter, having blades which may adequately chop carbon fibers 26 at various lengths, preferably between 12.5 and 75 millimeters, and deposit the chopped fibers onto the carrier film. Chopper 24 may be driven by any suitable motor (not shown).

As shown, system 10 further includes heated platform 28 which may be heated by any suitable means, such as by water pipes (not shown) from a water heater at approximately between 150° and 200° F. As coated carrier film 12 is wound through system 10, heated platform 28 provides heat thereto in order to keep the resin/filler paste 22 at a workable viscosity between 800 and 200,000 CPS.

FIG. 1 also illustrates heated rollers 30 which may also be heated at approximately between 150° and 200° F. As coated carrier film 14 is wound through system 10, heated rollers 30 provides heat thereto in order to keep the resin/filler paste 22 at a workable viscosity between 800 and 200,000 CPS. It is to be noted that heated rollers may be disposed in system 10 as needed without falling beyond the scope or spirit of the invention.

System 10 further includes chain link compaction belts 34 for covering the deposited carbon fibers with the second carrier film 14 and compacting films 12, 14 together, flanking chopped carbon fibers 26. Compaction belts 34 may be driven by any suitable motor to provide tension on the belts which compact carrier films 12, 14. Compaction belts 34 induce shear onto carrier films 12, 14 for added "wet-out" as described below. Preferably, compaction belts 34 include upper belt 36 and lower belt 38 which are driven in different speeds to further induce shear onto carrier films 12, 14. Upper belt 36 and lower belt 38 may also be driven to provide unsynchronized movements in order to further induce shear onto the carrier films and for added "wet-out." In order for this to be accomplished, for example, an oscillating cam (not shown) of the compaction belts may be connected to a motor (not shown) which drives belts 36, 38. Other ways to accomplish this do not fall beyond the scope or spirit of this invention.

FIG. 2 illustrates a method 110 of making a carbon fiber-filled sheet molding compound in accordance with system 10 of FIG. 1. The method includes preparing and providing a predetermined resin/filler paste 22 which may comprise a resin system solely, or a resin system and a filler system. The resin/filler paste 22 provides a continuous medium upon which carbon fibers may be deposited in order to utilize the carbon fiber properties, such as high stiffness, high flexibility, and light weight. In a resin/filler paste 22 having both a resin system and a filler system, the resin/filler paste 22 may include 35% weight resin system and 65% weight filler system. Other weight percent combinations including other additives do not fall beyond the scope or spirit of this invention.

The resin system may include a polyester resin solution, a styrene resin solution, and/or an epoxy vinyl ester resin solution. The resin system acts to bind fibers together which results in properties of high stiffness and high deformation resistance to heat while maintaining light weight properties. Other components do not fall beyond the scope or spirit of the present invention. The filler system may include a calcium carbonate solution. The filler system acts as a particle filler for the resin system where a predetermined amount of the resin system is used. Other components do not fall beyond the scope or spirit of this invention.

The method further includes providing first and second carrier films 12, 14 through system 10 of FIG. 1 such that winder 16 may wind films 12, 14 through system 10 as shown. Carrier films 12, 14 may be a thermoplastic, such as polyethylene, nylon, or any other suitable type of thermoplastic.

The resin paste 22 is loaded onto doctor boxes 18, 20 which respectively coat carrier films 12, 14 with the resin paste 22. That is, when resin paste 22 is on doctor boxes 18, 20, resin paste 22 is respectively spread onto opposed sides of carrier films 12, 14 substantially completely and evenly. Alternatively, resin paste 22 may be spread only on one of the sides of the carrier films, e.g. carrier film 12.

Then, the method further involves providing carbon fiber rovings to chopper 24 to be chopped. The carbon fibers 26 are commercial or automotive carbon fibers 26 with a size range of approximately 24,000 to 320,000 filaments. The method further includes conveying the carbon fibers 26 through chopper 24 and chopping the carbon fibers 26.

Moreover, the method includes providing the chopped carbon fibers 26 and randomly depositing the chopped carbon fibers 26 onto the coated side of first carrier film 12. Preferably, as shown in FIG. 3, the chopped carbon fibers 26 are deposited substantially evenly onto carrier film 12. FIG. 3 illustrates carrier film 12 having resin/filler paste 22 coated thereon and chopped carbon fibers 26 deposited on paste 22.

As first carrier film 12 is coated with resin paste 22 and deposited with chopped carbon fibers 26, second carrier film 14 which is also coated with resin paste 16 is disposed on first carrier film 12 such that the coated sides of carrier films 12, 14 flank chopped carbon fibers 26, defining a compactible laminate. After second carrier film 14 is disposed on first carrier film 12, the compactible laminate is conveyed through compaction belts 34 in which carrier films 12, 14 adhere to each other. As the laminate is conveyed through compaction belts 34, voids and air pockets within the laminate are "wetted out". The resin/filler paste 22 aids in allowing air pockets and voids caught between the carrier film layers to be filled or "wetted-out" by filling the air pockets and voids therein. As the laminate is "wetted-out," the resulting compacted laminate 40 is given substantial uniformity, added strength, stiffness, flexibility, and deformation resistance against high heat. FIG. 4 illustrates a cross-sectional view of the compacted laminate 40 after being conveyed through compaction belts 34.

After the laminate 40 is conveyed through compaction belts 34, the laminate 40 is wound about winder 16, and is allowed to mature by maintaining a temperature at approximately 85° F. for approximately 1–3 days, resulting in a matured SMC. After maturing, the resulting matured SMC may then be molded to a predetermined shape by compression molding.

It is to be noted that it may be desirable to dispose a vent system over the system 10 of FIG. 1 for the purpose of separating the chopped carbon fibers, which are conductive materials, from electrical circuits and junctions. This may be accomplished by installing a vent hood over an area of chopper 24 and chopped fibers 26, and venting the area to a vent bag, substantially eliminating carbon fiber contact with other objects. Additionally, junction boxes and electrical manifolds may be sealed with a sealing ingredient, such as silicone.

It is to be noted that at least one more cott roll or chopper similar to chopper 24 may be installed on system 10 concurrent with chopper 24 to facilitate chopping of glass fibers. This produces a glass fiber/carbon fiber hybrid reinforced composite. Other fibers may be used to produce other hybrid composites.

Moreover, system 10 may be configured to provide a switch to by-pass chopper 24 in order to permit the feeding of carbon fiber strands between the films. This produces SMC reinforced with continuous carbon fiber strands for higher stiffness and strength.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for making from laminate an automotive carbon fiber-filled sheet molding compound having the characteristics of light weight, high stiffness and high strength, the system comprising:

a mechanism for providing chopped automotive carbon fibers, a predetermined resin paste, a first carrier film, and a second carrier film;

a mechanism for coating substantially completely one side of one of the first and second carrier films with the predetermined resin paste to define a coated side;

a mechanism for depositing chopped automotive carbon fibers onto the coated side, wherein the coated side is the one side of the first and the second carrier films that is coated substantially completely with the predetermined resin paste;

a mechanism for covering the deposited carbon fibers with the second carrier film to define a compactable carbon-filled laminate; and a mechanism for compacting the carbon-filled laminate to admix the resin paste with the carbon fibers between the films, whereby to form the automotive carbon fiber-filled sheet molding compound.

2. The system of claim 1 wherein the paste is maintained at a viscosity between about 800 and 200,000 centipoise.

3. The system of claim 2 wherein the paste is maintained at the viscosity by applying heat to the paste at between about 150 and 200 degrees Fahrenheit.

4. The system of claim 1 wherein the chopped carbon fibers have lengths between about 12.5 and 75 millimeters.

5. The system of claim 1 wherein the carbon fibers have a size of between about 24,000 and 320,000 filaments.

6. The system of claim 1 wherein the paste includes about 35% weight of a resin system and about 65% weight of a filler system.

7. The system of claim 1 wherein the mechanism for compacting the carbon-filled laminate further wets-out the carbon-filled laminate.

8. The system of claim 1 wherein the compacted laminate is maintained at a predetermined temperature for a set time period, to mature the laminate for compression molding.

9. The system of claim 8 wherein the predetermined temperature is approximately 85 degrees Fahrenheit and the set time period is approximately between about 1 and 3 days.

10. The system of claim 1 further comprising coating substantially one side of the other of the first and second carrier films with the predetermined resin paste.

\* \* \* \* \*